Nov. 10, 1942.  G. H. BROWN  2,301,612

DIRECT READING METER

Filed June 29, 1940

Inventor
George H. Brown
By J. J. Huff
Attorney

UNITED STATES PATENT OFFICE 2,301,612

DIRECT READING METER

George H. Brown, Haddonfield, N. J., assignor to Radio Corporation of America, a corporation of Delaware Application June 29, 1940, Serial No. 343,082

12 Claims. (Cl. 171—95)

This invention relates to direct reading meters and especially to a meter for reading directly power, resistance or reactance in high or low frequency electrical circuits.

Wattmeters, for the measurement of electrical power, are well known to those skilled in the electrical art. Power in a load is equal to the square of the current through the load times the resistance of the load ($W=I^2R$). It follows that the resistance of the load equals the power in the load divided by the current squared or, $R=W/I^2$ (1). If the current through the load is held at a predetermined value, the wattmeter may be calibrated to indicate directly resistance in ohms.

Wattmeters employing resistors, thermocouples, and a meter for reading power as a function of the currents generated by the thermocouples have been designed. These prior devices employed circuit arrangements which produced meter deflections proportional to the scalar product of current and voltage together with a term proportional to the square of the load voltage, or a term proportional to the square of the load current, or both.

One of the principal objects of the present invention is to provide means whereby these undesired terms are eliminated from the wattmeter readings. Another object is to provide means for reading directly power in a load circuit without the introduction of undesired terms, which are functions of load voltage or load current. Another object is to provide means for determining directly the resistance of a load circuit as a function of the power applied to the load. An additional object is to provide means for determining the reactance of a load circuit as a function of the power applied to the load.

Figure 1:
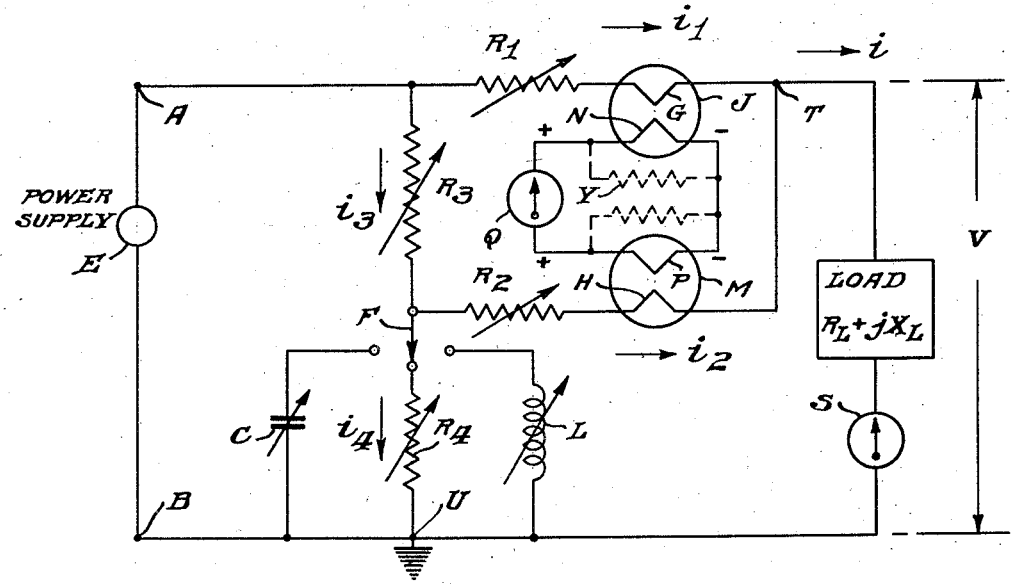
Figure 2:
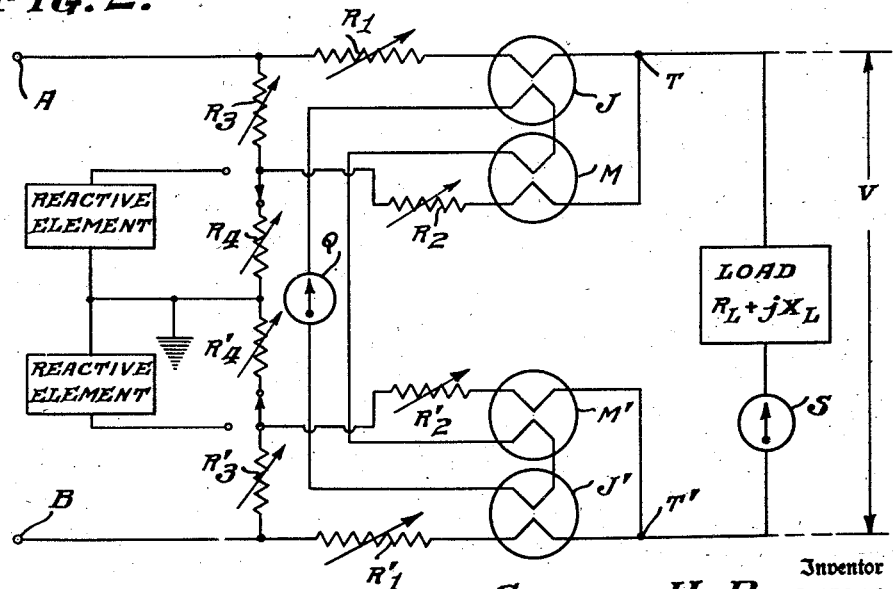

The invention will be described by referring to the accompanying drawing in which Figure 1 is a schematic circuit diagram of one embodiment of the invention and Figure 2 is a circuit diagram of a meter circuit which is balanced with respect to ground. Similar reference letters are applied to similar elements in the two figures.

Referring to Fig. 1, a pair of terminals A, B are connected to a power source such as an alternator or oscillator E. A pair of resistors $R_3$, $R_4$ are serially connected across the terminals A, B. A capacitor C or an inductor L, preferably the former, may be substituted for the resistor $R_4$ by a switch F. A pair of resistors $R_1$, $R_2$ and the heater elements G, H of a pair of vacuum thermocouples J, M are connected in series across the resistor $R_3$. The thermocouple output elements N, P are connected in series opposition to the output meter Q. The load circuit $R_L+jX_L$, plus the load meter S, is connected from the junction T, or point of symmetry, of the thermocouple heaters to the lower terminal U, or ground of the resistor $R_4$, which may be grounded. The thermocouples J, M, should be perfectly matched. If they are not matched, the thermocouple with the larger output voltage may be shunted by a resistor Y. When the thermocouples are perfectly matched and equal currents are flowing through the heaters G, H, the output meter Q deflection will be zero.

Before considering the operation of the circuit, the mathematical theory and proof of operation will be deduced. The several resistances of the several resistors are designed as $R_1$, $R_2$, $R_3$ and $R_4$. The output load as $R_L+jX_L$; the voltage across the output load as $v$; and the current through the load as $i$. Then $$v = -i_2 R_2 + i_4 R_4 \quad (2)$$

and, where O represents zero, $$O = -i_1 R_1 + i_2 R_2 + i_3 R_3 \quad (3)$$

Also, $$i_2 = i - i_1 \quad (4)$$

and $$i_4 = i_3 - i_4 = i_3 - i + i_1 \quad (5)$$

Substituting (4) and (5) in (2) and (3), we obtain $$v = -(i-i_1)R_2 + (i_3-i+i_1)R_4 \quad (6)$$
$$O = -i_1 R_1 + (i-i_1)R_2 + i_3 R_3 \quad (7)$$

Rewriting, (6) and (7) become $$v + i(R_2+R_4) = i_1(R_2+R_4) + i_3 R_4 \quad (8)$$
$$-iR_2 = -i_1(R_1+R_2) + i_3 R_3 \quad (9)$$

Let $$R_3(R_2+R_4) + R_4(R_1+R_2) = D \quad (10)$$

Then, from (8) and (9), $$Di_1 = vR_3 + i\{R_3(R_2+R_4) + R_2 R_4\} \quad (11)$$

and $$Di_3 = v(R_1+R_2) + i\{(R_2+R_4)(R_1+R_2) - R_2(R_2+R_4)\} \quad (12)$$

$$Di_3 = v(R_1+R_2) + iR_1(R_2+R_4) \quad (13)$$

Substituting (10) and (11) in (4), we obtain $$Di_2 = -vR_3 + iR_4 R_1 \quad (14)$$

In order to make the coefficients of the terms in (11) and (14) identical, let $$R_4 R_1 = R_3(R_2+R_4) + R_2 R_4 \quad (15)$$

or $$R_2 = \frac{R_1-R_3}{1+\frac{R_3}{R_4}} \quad (16)$$

Then (10) becomes $$D = 2R_1 R_4 \quad (17)$$

and $$i_1 = \frac{vR_3}{2R_1 R_4} + \frac{i}{2} \quad (18)$$

$$i_2 = \frac{-vR_3}{2R_1 R_4} + \frac{i}{2} \quad (19)$$

Let us suppose that the load impedance is $R_L+jX_L$. Then the load voltage is $$v = i(R_L + jX_L) \quad (20)$$

and (18) and (19) become $$i_1 = \frac{i}{2}\left[\frac{R_3}{R_1R_4}(R_L+jX_L)+1\right] \quad (21)$$

and $$i_2 = \frac{i}{2}\left[\frac{R_3}{R_1R_4}(R_L+jX_L)+1\right] \quad (22)$$

The square of the absolute value of (21) is $$(|i_1|)^2 = \frac{i^2}{4}\left[1+\left(\frac{R_3R_L}{R_1R_4}\right)^2+\left(\frac{R_3X_L}{R_1R_4}\right)^2+\frac{2R_3R_L}{R_1R_4}\right] \quad (23)$$

and (22) yields $$(|i_2|)^2 = \frac{i^2}{4}\left[1+\left(\frac{R_3R_L}{R_1R_4}\right)^2+\left(\frac{R_3X_L}{R_1R_4}\right)^2-\frac{2R_3R_L}{R_1R_4}\right] \quad (24)$$

The output meter Q of the pair of thermocouples reads proportional to the difference of the quantities given by (23) and (24). This meter reading M is $$M = Ki^2\frac{R_3R_L}{R_1R_4} \quad (25)$$

where K is the thermocouple constant. That is, if only one heater carries current, this current squared multiplied by K would give the meter deflection. If now the current in the load is held constant, by adjustment of the source E, the deflection of the output meter Q will be exactly proportional to the load resistance, even though the load impedance has a reactive component.

By way of example, the following elements were employed: Each thermocouple had a maximum rated heater current of 0.10 ampere, a heater resistance of 2.3 ohms, and a constant K equal to 67,500 (if the heater current is expressed in amperes and the output meter deflection in microamperes). The thermocouple output meter Q has a full scale deflection of 200 microamperes and a resistance of 8.0 ohms. $R_1$, $R_3$ and $R_4$ were so chosen that when the load current $i$ was held at 0.075 ampere (75 milliamperes), the thermocouple output meter directly indicated the load resistance. The load current $i$ having been chosen, $R_1$ and $R_3$ were selected. Then $R_4$ was made to have the value which made the load meter S read properly. $R_2$ was adjusted to the value indicated by Equation 16. This is done by short-circuiting the load impedance, feeding a small amount of power into the remaining network, and adjusting $R_2$ until the reading of the thermocouple output meter Q was zero.

Since a thermogalvanometer type meter with a full scale deflection of 120 milliamperes is used in series with the load impedance to indicate the proper load current, the meter will always read the sum of the load resistance and the meter resistance, which is 5.2 ohms. In further discussion, this meter resistance will be considered as part of the load resistance.

By way of example, the specific values used in a practical instrument are as follows, if the instrument is to read a range of resistances from zero to 20 ohms. With a load resistance of 20 ohms, the output meter should read 200, which is full scale. $R_1$ is made equal to 20.0 ohms. This includes 2.3 ohms of heater resistance, so that the resistance external to the thermocouple in this leg of the circuit is 17.7 ohms. $R_3$ is made equal to 10.0 ohms, and $R_4$ is made to equal 18.95 ohms. Then from (16), $R_2$ is 6.55 ohms, including the heater resistance of 2.3 ohms. Then with a load current of 0.075 ampere, and a load resistance of 20.0 ohms, we find from (25) that $$M = \frac{67,500 \times 0.075^2 \times 10 \times 20}{20 \times 18.95} = 200 \quad (26)$$

It is important to examine the currents which will exist in the separate thermocouple elements under various load conditions to avoid burning out the thermocouple heaters. In Table I, below, are listed the currents as a function of load resistance, when the load has zero reactance ($X_L=0$).

*Table I*

($X_L = 0$)

| $R_L$ (ohms) | $i_1$ | $i_2$ |
|---|---|---|
| | *Amperes* | *Amperes* |
| 20 | 0.0572 | 0.0178 |
| 15 | 0.0523 | 0.0227 |
| 10 | 0.0474 | 0.0276 |
| 5 | 0.0425 | 0.0325 |
| 2 | 0.0395 | 0.0355 |
| 0 | 0.0375 | 0.0375 |

The greatest strain on one thermocouple comes when the load resistance is 20.0 ohms. The current conditions, when the load is reactive, with a resistance of 20.0 ohms will be examined. These results are shown in Table II, below. The reactance may be either positive or negative.

*Table II*

($R_L = 20.0$)

| $X_L$ (ohms) | $i_1$ | $i_2$ |
|---|---|---|
| | *Amperes* | *Amperes* |
| 0 | 0.0572 | 0.0178 |
| 10 | 0.0581 | 0.02035 |
| 20 | 0.0605 | 0.02665 |
| 40 | 0.0695 | 0.0435 |
| 80 | 0.0977 | 0.0814 |
| 100 | 0.114 | 0.1008 |

Other pertinent data for the condition of zero load reactance are given in the following table.

*Table III*

($X_L = 0$)

| $R_L$ (ohms) | $i_{input}$ | $R_{input}$ | Watts input |
|---|---|---|---|
| | *Amperes* | *Ohms* | |
| 20 | 0.1602 | 16.48 | 0.423 |
| 15 | 0.142 | 15.28 | 0.308 |
| 10 | 0.1241 | 13.61 | 0.21 |
| 5 | 0.1059 | 11.6 | 0.13 |
| 2 | 0.0952 | 9.9 | 0.0897 |
| 0 | 0.08792 | 8.55 | 0.066 |

If $R_1$ and $R_3$ are held at their present values, and $R_4$ changed to 189.5 ohms, $R_2$ must be rebalanced so that it is equal to 9.5 ohms. Then from (25) and (26), it is found that a load resistance of 200 ohms with the same load current as before will give a full scale meter deflection of 200. Furthermore, all values of $R_L$ and $X_L$ in Tables I and II may be multiplied by ten, and the current data given there may be used unchanged. However, a new Table IV, corresponding to Table III must be prepared.

*Table IV*

($X_L=0$)

| $R_L$ (ohms) | $i_{input}$ | $R_{input}$ | Watts input |
|---|---|---|---|
| | Amperes | Ohms | |
| 200 | 0.1548 | 104.2 | 2.5 |
| 150 | 0.1355 | 90.5 | 1.66 |
| 100 | 0.1158 | 73.0 | 0.98 |
| 50 | 0.0971 | 47.3 | 0.448 |
| 20 | 0.08465 | 27.1 | 0.194 |
| 0 | 0.07687 | 9.75 | 0.0575 |

If $R_4$ is changed to 1895 ohms, and $R_2$ adjusted to a value of 9.95 ohms, full scale meter reading with a load resistance of 2000 ohms will result. For this connection, the conditions existing at the input terminals are shown in Table V.

*Table V*

($X_L=0$)

| $R_L$ (ohms) | $i_{input}$ | $R_{input}$ | Watts input |
|---|---|---|---|
| | Amperes | Ohms | |
| 2000 | 0.154 | 984.0 | 23.3 |
| 1500 | 0.1345 | 845.0 | 15.35 |
| 1000 | 0.1148 | 662.0 | 8.71 |
| 500 | 0.0948 | 405.0 | 3.63 |
| 200 | 0.083 | 190.0 | 1.31 |
| 0 | 0.0751 | 10.0 | 0.0563 |

The input power for a load resistance of 2000 ohms gets to be rather large. Fortunately, one seldom meets an antenna resistance above 500 ohms. For resistances above 500 ohms, simply set the load current to $0.707 \times 0.075$ or 0.053 ampere, and multiply the resulting output meter reading by two. If this expedient is followed, the maximum input power would be 11.65 watts.

From the foregoing it may be seen that the load resistance is indicated directly on an output meter Q, with three ranges of resistance, namely 0–20 ohms, 0–200 ohms, and 0–2000 ohms. It is also desirable to be able to measure the load reactance by the same means, but it is not necessary in general that the reactance be measured with the same degree of accuracy as the resistance. To see how this result may be accomplished, use the meter Q on the 0–200 resistance range, with $R_2$ equal to 9.5 ohms. Substitute for $R_4$ a capacitor C which is substantially free of resistance. The balance condition given by (16) will be upset somewhat, but will be ignored for the present. Hereinafter it will be shown that it is not of primary importance in making this reactance measurement.

Now assume that the system remains substantially in balance. In Equations 21 and 22 change $R_4$ to $j\omega C$, where C is the capacitance which is inserted, and $\omega$ is $2\pi f$. The the formula corresponding to 23 is $$(|i_1|)^2 = \frac{i^2}{4}\left[1 + \left(\frac{R_3 \omega C X_L}{R_1}\right)^2 + \left(\frac{R_3 \omega C R_L}{R_1}\right)^2 - \frac{2 R_3 \omega C X_L}{R_1}\right] \quad (27)$$

and the counterpart of (24) is $$(|i_2|)^2 = \frac{i^2}{4}\left[1 + \left(\frac{R_3 \omega C X_L}{R_1}\right)^2 + \left(\frac{R_3 \omega C R_L}{R_1}\right)^2 + \frac{2 R_3 \omega C X_L}{R_1}\right] \quad (28)$$

Subtract (28) from (27), and write the equation correspoding to (25), as follows:

$$M = -Ki^2 \frac{R_3}{R_1} \omega C X_L \quad (29)$$

If the load reactance is inductive, the output meter will read backwards, and must be reversed from the connection used in measuring resistance. If the load reactance is capacitive, the meter will read up in the same direction as when reading resistance. The deflection is proportional to the reactance of the condenser C, which changes with the frequency. Therefore, to obtain true reactance readings, it is necessary to divide by a constant times the frequency.

If, for $R_4$, a capacitor C is substituted which has a reactance of 189.5 ohms at a frequency of one megacycle, the meter reading is divided by the frequency, expressed in megacycles, to obtain the load reactance.

If an inductance L is substituted instead of a capacitor then an inductive load would make the meter read in the same direction as when reading resistance, and the meter reading should be multiplied by a contant times the frequency to obtain the load reactance. In practice, inductance L is not ordinarily used.

Returning now to the effects of the omission of reactance in the resistance $R_2$, in order to satisfy (16), the following table has been computed from the exact expressions to show that reasonably accurate results are obtained notwithstanding the fact that the conditions of (16) have only been fulfilled for the corresponding resistance-measuring circuit.

*Table VI*

($f=1.0$ mc.)

| $X_L$ (ohms) | Meter readings | |
|---|---|---|
| | ($R_L=200$) | ($R_L=0$) |
| 200 | 200.5 | 197.0 |
| 100 | 99.0 | 96.5 |
| 10 | 8.2 | 5.65 |
| 0 | −1.92 | −4.48 |
| −10 | −12.0 | −14.6 |
| −100 | −103.0 | −105.5 |
| −200 | −204.0 | −207.0 |

To summarize the conditions existing for the various circuit elements, reference is made to the following table.

*Table VII*

| Meter range | | $R_1$ | $R_2$ | $R_3$ | $R_4$ | C |
|---|---|---|---|---|---|---|
| Resistance | Reactance at 1.0 mc. | | | | | |
| | | Ohms | Ohms | Ohms | Ohms | Micromicrofarads |
| 0–20 | | 20.0 | 6.55 | 10.0 | 18.95 | |
| | 0–20 | 20.0 | 6.55 | 10.0 | | 8400.0 |
| 0–200 | | 20.0 | 9.5 | 10.0 | 189.5 | |
| | 0–200 | 20.0 | 9.5 | 10.0 | | 840.0 |
| 0–2000 | | 20.0 | 9.95 | 10.0 | 1895.0 | |
| | 0–2000 | 20.0 | 9.95 | 10.0 | | 84.0 |

The circuit of Fig. 1 is not balanced with respect to ground; in some uses a balanced circuit is desirable. Fig. 2 is a schematic circuit diagram of a symmetrical or balanced circuit. Pairs of resistor networks $R_1$, $R_2$, $R_3$, $R_4$ and $R'_1$, $R'_2$, $R'_3$, $R'_4$ are used. In a like manner, two pairs of thermocouples J, M and J'M' are used. A single thermocouple output meter Q is employed. The thermocouples should either be balanced, or balancing resistors (see Y of Fig. 1). In other respects, the balanced circuit is similar to that of Fig. 1.

Thus the invention has been described as a wattmeter which may be arranged to indicate directly the resistance or reactance of a load. The mode of operation may be summarized as follows:

The oscillator or power source E is first set to the desired frequency. With the proper values of $R_1$, $R_3$, and $R_4$ in place, the load impedance, including the radio frequency meter S for reading load current, is shorted out. $R_2$ is then adjusted until the output meter Q reads zero. The short circuit on the output is then removed, the oscillator output increased until the load current is 0.075 ampere, and the output meter reading noted. This reading is the load resistance plus the radio frequency meter S resistance of 5.2 ohms. To read reactance, $R_4$ is removed and the appropriate C inserted. The proper $R_2$ resistance must be in place. The oscillator output is again increased until the proper load current is obtained, and the output meter reading noted. This meter reading is then divided by the frequency to obtain the reactance.

The reactance and resistance measurements may be made accurately up to several megacycles; the resistance measurements may be made accurately with direct current or sixty-cycle current from E without circuit modification.

The adjustments of C and $R_4$ are preferably made, in practice, when the instrument is built, and do not ordinarily have to be varied during the process of measuring. While these elements have been shown as variable, in actual practice provisions are made for switching in different predetermined values of $R_4$ and C, as will be obvious from the above description of the system.

I claim as my invention:

1. An electrical indicator including first terminals for connection to a power source, second terminals for connection to the load to be indicated, a pair of resistors serially connected across said first terminals, a second pair of resistors, a pair of thermocouples including heater and output elements, said second pair of resistors and said thermocouple heaters being electrically connected with the first of said first pair of resistors, said second terminals being connected respectively to a low potential terminal of the second of said first pair of resistors and to a point of symmetry in said circuit including said thermocouple heaters and said second pair of resistors, a thermocouple output meter, and means connecting said thermocouple output elements to said output meter in series opposition.

2. An indicator as set forth in claim 1 including a meter serially connected to said one of said second terminals for indicating the current applied to said load.

3. A direct reading meter for indicating the resistance of a load including means for connecting said meter to said load and to the source of power to be applied to the load, a first pair of resistors connected in series across said power connection, a second pair of resistors, a pair of thermocouples including heaters and output elements, means connecting said thermocouple heaters, said second pair of resistors and the first resistor of said first pair of resistors, and means connected to said thermocouple output elements for indicating the difference in output of said thermocouples upon application of a load to said load-connecting means, said load-connecting means being connected effectively to the junction of said thermocouple heaters and to the lower terminal of the second resistor of said first pair of resistors.

4. An indicator as set forth in claim 3 including means for substituting a reactive element for the second resistor of said first pair of resistors whereby the reactance of said load may be indicated.

5. A meter for indicating the resistance of an electrical load including a first pair of serially connected resistors, a pair of thermocouples, a second pair of resistors connected to the first of said first pair of resistors and to the heaters of said thermocouples, means connected to said thermocouples for indicating the difference in their outputs upon application of current to their heaters, means for connecting said first pair of resistors to a source of power, and means for connecting the load to be measured to the symmetrical junction of said heater circuit and to the lower terminal of the second resistor of said first pair of resistors.

6. A meter as set forth in claim 5 in which a meter is included in the load circuit for indicating a predetermined load condition, so that said difference in thermocouple outputs indicates directly the resistance of the load.

7. A meter as set forth in claim 5 including means for substituting a reactive element for the second resistor of said first pair of resistors whereby the reactance of said load may be indicated.

8. An electrical meter having a symmetrical circuit including four resistors serially connected and having their midpoint grounded, a first pair of resistors, a first pair of thermocouples, said first pair of resistors, the heaters of said first pair of thermocouples, and the first of said four resistors being connected in series, a second pair of resistors, a second pair of thermocouples, said second pair of resistors, the heaters of said second pair of thermocouples, and the fourth of said four resistors being connected in series, a meter, means serially connecting the outputs of said thermocouples and said meter, and means for connecting a load between points of symmetry in the respective serial circuits including the heaters of said first and second pairs of thermocouples.

9. A meter as set forth in claim 8 including a load meter connected in said load circuit for indicating a predetermined condition of the load so that said first-mentioned meter indicates the resistance of the load.

10. A meter as set forth in claim 8 including means for substituting capacitative reactive elements for the second and third of said four resistors in similar circuit relation so that the reactance of said load may be determined.

11. An electrical measuring system comprising a source of electrical power, a plurality of impedance elements connected in series across said source, a pair of thermocouples including heater and output elements, respectively, a current controlling resistor connected electrically in circuit with at least one of said heater elements, said heater elements being connected between spaced points, respectively, on one of said impedance elements and an output terminal, a load circuit connected electrically between said output terminal and a point on another of said impedance elements, and a meter connected in circuit with said output elements of said thermocouples.

12. An electrical measuring system comprising a source of electrical power, a plurality of impedance elements connected in series across said source, a pair of thermocouples including heater and output elements, respectively, a pair of current controlling resistors connected electrically in circuit with said heater elements, respectively, said heater elements and said resistors being connected, respectively, between spaced points on one of said impedance elements and a point of symmetry, a load circuit connected electrically between said point of symmetry and another of said impedance elements, and an output meter connected in circuit with said output elements of said thermocouples.

GEORGE H. BROWN.